(12) United States Patent
Yao et al.

(10) Patent No.: US 12,133,173 B2
(45) Date of Patent: Oct. 29, 2024

(54) POWER CONTROL METHOD AND APPARATUS, AND SENDING METHOD AND APPARATUS FOR UPLINK TRANSMISSION

(71) Applicant: ZTE CORPORATION, Guangdong (CN)

(72) Inventors: Ke Yao, Guangdong (CN); Zhaohua Lu, Guangdong (CN); Bo Gao, Guangdong (CN)

(73) Assignee: ZTE CORPORATION (CN)

( * ) Notice: Subject to any disclaimer, the term of this patent is extended or adjusted under 35 U.S.C. 154(b) by 0 days.

(21) Appl. No.: 17/768,025

(22) PCT Filed: Oct. 9, 2020

(86) PCT No.: PCT/CN2020/119921
§ 371 (c)(1),
(2) Date: Apr. 11, 2022

(87) PCT Pub. No.: WO2021/068881
PCT Pub. Date: Apr. 15, 2021

(65) Prior Publication Data
US 2024/0107460 A1 Mar. 28, 2024

(30) Foreign Application Priority Data
Oct. 12, 2019 (CN) .......................... 201910969707.6

(51) Int. Cl.
*H04W 52/14* (2009.01)
*H04W 52/24* (2009.01)

(52) U.S. Cl.
CPC ....... *H04W 52/146* (2013.01); *H04W 52/242* (2013.01)

(58) Field of Classification Search
CPC . H04W 52/146; H04W 52/242; H04W 76/27; H04W 52/42; H04W 52/367
See application file for complete search history.

(56) References Cited

U.S. PATENT DOCUMENTS

| 10,264,575 B2 | 4/2019 | Dinan |
| 2004/0203981 A1 | 10/2004 | Budka et al. |
| 2013/0310102 A1 | 11/2013 | Chao et al. |

(Continued)

FOREIGN PATENT DOCUMENTS

| CN | 101136673 A | 3/2008 |
| CN | 101527958 A | 9/2009 |

(Continued)

OTHER PUBLICATIONS

Intellectual Property India, Examination Report for Application No. 202227027234, report issue date Sep. 7, 2022.

(Continued)

*Primary Examiner* — Angelica Perez
(74) *Attorney, Agent, or Firm* — McDonald Hopkins LLC

(57) ABSTRACT

Provided are a power control method and apparatus, and a sending method and apparatus for uplink transmission. The power control method includes: in the case where a first condition is satisfied, determining, by a first communication node, a power control parameter of uplink transmission in a predetermined manner, or determining, by the first communication node, the power control parameter of the uplink transmission autonomously.

13 Claims, 7 Drawing Sheets

(56) References Cited

U.S. PATENT DOCUMENTS

| | | | |
|---|---|---|---|
| 2016/0135147 A1 | 5/2016 | Ouchi et al. | |
| 2018/0310251 A1* | 10/2018 | Lee | H04W 52/08 |
| 2020/0205093 A1* | 6/2020 | Kim | H04W 52/42 |
| 2022/0124763 A1* | 4/2022 | Takeda | H04W 48/16 |

FOREIGN PATENT DOCUMENTS

| | | |
|---|---|---|
| CN | 104812029 A | 7/2015 |
| CN | 105307254 A | 2/2016 |
| CN | 105307254 B | 11/2018 |
| CN | 109302273 | 2/2019 |
| CN | 109803362 | 5/2019 |
| CN | 110035484 | 7/2019 |
| CN | 111083773 | 4/2020 |
| EP | 2741552 A1 | 6/2014 |
| EP | 3624505 A1 | 3/2020 |
| KR | 20180136858 A | 12/2018 |
| WO | 2013017948 | 2/2013 |

OTHER PUBLICATIONS

Office Action dated Jun. 9, 2023; Canadian Patent Application No. 3,154,507.

Extended European Search Report dated Sep. 29, 2023; European Patent Application No. 20874639.6.

Samsung: "On UL Power Control", 3GPP Draft; R1-1717692 on UL Power Control-Samsung, 3rd Generation Partnership Project (3GPP), Mobile Competence Centre ; 650, Route Des Lucioles ; F-06921 Sophia-Antipolis Cedex; France.

3GPP TS 38.213 V15.7.0 (Sep. 2019). 3rd Generation Partnership Project; Technical Specification Group Radio Access Network; NR; Physical layer procedures for control (Release 15).

Patent Cooperation Treaty (PCT), International Search Report and Written Opinion for Application PCT/CN2020/119921 filed on Oct. 9, 2020, mailed Dec. 30, 2020, International Searching Authority, CN.

Chinese Office Action and Search Report dated Aug. 30, 2024; Chinese Patent Application No. 201910969707.6.

\* cited by examiner

In the case where a first condition is satisfied, a first communication node determines a power control parameter of uplink transmission in a predetermined manner, or the first communication node determines the power control parameter of the uplink transmission autonomously — S602

FIG. 6

In the case where a third condition is satisfied, a first communication node reports a measurement result to a second communication node — S702

The first communication node determines power of uplink transmission according to a power control parameter sent by the second communication node — S704

FIG. 7

A first communication node receives a power control parameter sent by a second communication node — S802

The first communication node determines power of uplink transmission according to the power control parameter — S804

FIG. 8

POWER CONTROL METHOD AND APPARATUS, AND SENDING METHOD AND APPARATUS FOR UPLINK TRANSMISSION

CROSS-REFERENCE TO RELATED APPLICATIONS

This application is a U.S. National Stage Application, filed under 35 U.S.C. 371 of International Patent Application No. PCT/CN2020/119921 filed on Oct. 9, 2020, which claims priority to Chinese Patent Application No. 201910969707.6 filed with the China National Intellectual Property Administration (CNIPA) on Oct. 12, 2019, the disclosure of which is are incorporated herein by reference in their entireties.

TECHNICAL FIELD

The present application relates to the field of communication, for example, a power control method and apparatus and a sending method and apparatus for uplink transmission.

BACKGROUND

One of the key features of 5th Generation Mobile Communication Technology (5G) new radio (NR) is supporting high frequency bands. There are abundant frequency domain resources in the high frequency bands, but a problem of a small coverage caused by fast attenuation of radio signals exists. The manner of sending signals in a beam mode can concentrate energies into a relatively small spatial range, thereby improving the coverage of signals in the high frequency bands. Generally, power control parameters of uplink transmission are related to a sending beam for the uplink transmission. Abase station may control the power control parameters by flexibly indicating the beam for the uplink transmission. However, in some scenarios, the base station supports multiple beams, and a UE does not distinguish those beams from each other. As a result, the base station cannot flexibly use the variation of the sending beam to change the corresponding power control parameters when scheduling the uplink transmission.

In view of the preceding problem in the related art, no effective solution has yet been proposed.

SUMMARY

Embodiments of the present disclosure provide a power control method and apparatus and a sending method and apparatus for uplink transmission, so as to at least solve the following problem in the related art: since a terminal does not distinguish among beams, when scheduling uplink transmission, a base station cannot flexibly use change of a sending beam to change a corresponding power control parameter.

According to an embodiment of the present application, a power control method is provided and the power control method includes: in a case where a first condition is satisfied, determining, by a first communication node, a power control parameter of uplink transmission in a predetermined manner, or determining, by the first communication node, the power control parameter of the uplink transmission autonomously.

According to an embodiment of the present application, a power control method is provided and the power control method includes: in a case where a third condition is satisfied, reporting, by a first communication node, a measurement result to a second communication node; and determining, by the first communication node, power of uplink transmission according to a power control parameter sent by the second communication node.

According to an embodiment of the present application, a power control method is provided and the power control method includes: receiving, by a first communication node, a power control parameter sent by a second communication node; and determining, by the first communication node, power of uplink transmission according to the power control parameter. Where an effective time of the power control parameter is determined according to at least one of the following: in the case where PL-RS included in power control parameter information belongs to a reference signal (RS) set for measuring a path loss (PL) of the first communication node, the power control parameter being effective after correctly received; and in the case where the PL-RS included in the power control parameter information does not belong to the RS set for measuring the PL of the first communication node, the power control parameter being effective after correctly received for a first time.

According to another embodiment of the present application, a power control apparatus is provided. The power control apparatus is applied to a first communication node side and includes: a first determination module configured to, in the case where a first condition is satisfied, determine a power control parameter of uplink transmission in a predetermined manner, or trigger the first communication node to determine the power control parameter of the uplink transmission autonomously.

According to another embodiment of the present application, a power control apparatus is provided. The power control apparatus is applied to a first communication node side and includes a reporting module configured to, in the case where a third condition is satisfied, report a measurement result to a second communication node; and a second determination module configured to determine power of uplink transmission according to a power control parameter sent by the second communication node.

According to another embodiment of the present application, a power control apparatus is provided. The power control apparatus is applied to a first communication node side and includes a receiving module configured to receive a power control parameter sent by a second communication node; and a third determination module configured to determine power of uplink transmission according to the power control parameter. Where an effective time of the power control parameter is determined according to at least one of the following: in the case where PL-RS included in power control parameter information belongs to a reference signal (RS) set for measuring a path loss (PL) of the first communication node, the power control parameter being effective after correctly received; and in the case where the PL-RS included in the power control parameter information does not belong to the RS set for measuring the PL of the first communication node, the power control parameter being effective after correctly received for a first time.

According to another embodiment of the present application, a sending apparatus for uplink transmission is further provided. The sending apparatus for uplink transmission is applied to a first communication node side and includes a fourth determination module configured to determine a sending type of uplink transmission according to reference signal information or a predetermined manner. Where the sending type of the uplink transmission includes a first type and a second type, and a time interval between the uplink transmission of the first type and the uplink transmission of the second type is greater than or equal to a first time offset.

An electronic apparatus is further provided according to another embodiment of the present application and includes a memory and a processor. The memory stores computer programs and the processor is configured to execute the computer programs to perform steps of any one of the preceding method embodiments.

According to another embodiment of the present disclosure, a computer-readable storage medium storing a computer program is further provided. When executed, the computer program is configured to perform steps of any one of the preceding method embodiments.

In the present application, in the case where the first condition is satisfied, the first communication node determines the power control parameter of the uplink transmission in the predetermined manner, or the first communication node autonomously determines the power control parameter of the uplink transmission. In this manner, the first communication node may independently determine the power control parameter so as to solve the following problem in the related art: since a terminal does not distinguish between beams, when scheduling the uplink transmission, a base station cannot flexibly use change of a sending beam to change a corresponding power control parameter. Therefore, the flexibility of power control is improved.

BRIEF DESCRIPTION OF DRAWINGS

The drawings described herein are used to provide a further understanding of the present application and form a part of the present application. The example embodiments and descriptions thereof in the present application are used to explain the present application and not to limit the present application in any improper way. In the drawings:

FIG. 6 is flowchart one of a power control method according to an embodiment of the present disclosure;

FIG. 7 is flowchart two of a power control method according to an embodiment of the present disclosure;

FIG. 8 is flowchart three of a power control method according to an embodiment of the present disclosure;

DETAILED DESCRIPTION

Figure 1:
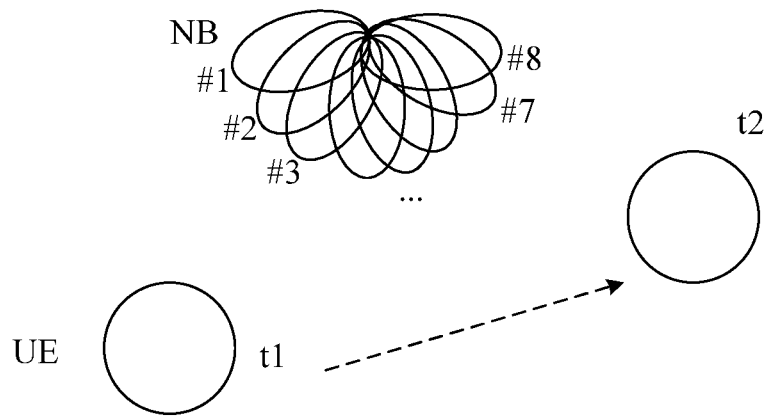
FIG. 1 is a diagram showing an FR1 beam.

The present application is described hereinafter with reference to the drawings and in conjunction with embodiments.

Terms "first", "second" and the like in the description, claims and preceding drawings of the present application are used for distinguishing between similar objects and are not necessarily used for describing a particular order or sequence.

Frequency bands supported by an NR system are divided into two types: frequency range 1 (FR1) and frequency range 2 (FR2), where a frequency of FR1 is lower than a frequency of FR2. For example, a spectrum range supported by FR1 ranges from 410 MHz to 7125 MHz, and a spectrum range supported by FR2 ranges from 24250 MHz to 52600 MHz. Due to the high frequency and fast signal attenuation, transmission in a beam mode is required in an FR2 scenario. The transmission in a beam mode may concentrate the energy of the signal in a specific direction, and a utilization rate of energy or power is higher than that of an omnidirectional transmission in a non-beam mode. In the FR2 scenario, both a base station and a UE need to support several beams during transmission and reception. Therefore, when the base station allocates uplink resources to the UE for sending uplink transmission, the UE needs to be instructed to send the beam for the uplink transmission. In an FR1 scenario, the signal attenuation is relatively slow. Generally, the base station needs to support multiple beams, but the UE does not need to support multiple beams. Therefore, when the base station allocates uplink resources to the UE for sending uplink transmission, the UE does not need to be instructed to send the beam for the uplink transmission.

In a power control mechanism of the existing system, the power control parameter is associated with beam indication information of the uplink transmission (a sounding reference signal resource indicator (SRI) of a physical uplink shared channel (PUSCH) or a spatial relation of a physical uplink control channel (PUCCH)). In the FR2 scenario, different uplink transmission beams are indicated so as to indicate the power control parameters. In the case where no beam indication (for example, FR1) exists, a default power control parameter is used. Since association of the power control parameter with the beam indication is configured in radio resource control (RRC), the position movement or rotation of the UE causes the beam to not match the power control parameter. The power control parameter may only be updated by the base station using high layer signaling (for example, RRC signaling).

In the FR1 scenario, although the SRI of the PUSCH and the spatial relation of the PUCCH does not need to be indicated, the power control parameter still need to be updated since an optimal downlink beam is changing. The base station side supports 8 beams, numbered from #1 to #8, and all or more of the 8 beams may be received by the UE. It is assumed that at an occasion t1, best communication between the UE and the #3 beam of the base station is achieved, and at an occasion t2, best communication between the UE and the #7 beam of the base station is achieved. In the FR1 scenario, multiple beams (or all beams) at the base station side may receive a sending signal of the UE. From the perspective of the base station side, when the optimal beam changes from #3 to #7, requirements for transmit power of the UE basically do not change greatly. However, from the perspective of the UE, at the occasion t2, a PL measured by using the #3 beam is very large, which causes uplink transmission transmit power of the UE to exceed an actual requirement. At this time, the power control parameter (e.g. at least a reference signal for measuring the PL, such as PathLoss-Reference Signal (PL-RS)) needs to be updated.

If the PL-RS is not updated, the transmit power of the UE is relatively high. Although sending is performed by multiple times, the base station may also gradually reduce the excess power through a transmit power control (TPC) command in a cumulative closed-loop power control manner, but the disadvantages includes: 1. an adjustment process being very slow; 2. the TPC command being not applicable to a closed-loop power control manner of an absolute value.

As shown in FIG. 1, the beam may be a resource (for example, a sending end spatial filter, a receiving end spatial filter, sending end precoding, receiving end precoding, an antenna port, an antenna weight vector and an antenna weight matrix), and a beam or a beam serial number may be replaced with a resource index (for example, a reference signal resource index and a spatial relation index). Since the beam may be bound with some time-frequency code resources in transmission, the beam may also be a transmission (sending/receiving) manner, and the transmission manner may include space division multiplexing, frequency domain/time domain diversity, and the like. Furthermore, the base station end, that is, the base station, may perform quasi co-location (QCL) configuration for two reference signals and inform a user end, that is, a terminal (or referred to as the user equipment (UE)), so as to describe a channel characteristic hypothesis. Parameters related to the QCL at least include Doppler spread, Doppler translation, delay spread, average delay, average gains, and a spatial parameter. The spatial parameter may include a spatial receiving parameter, such as an angle of arrival, spatial correlation of a receiving beam, the average delay, and correlation of a time-frequency channel response (including phase information).

The reference signal includes at least one of the following: a channel state information reference signal (CSI-RS), a channel state information interference measurement signal (CSI-IM), a demodulation reference signal (DMRS), a downlink demodulation reference signal (DL DMRS), an uplink demodulation reference signal (UL DMRS), a sounding reference signal (SRS), a phase-tracking reference signal (PTRS), a random access channel (RACH), a synchronization signal (SS), a synchronization signal block (SSB), a primary synchronization signal (PSS), or a secondary synchronization signal (SSS).

In some techniques, the operation related to the beam is described as follows. The base station configures an SRS resource set for the UE, where the SRS resource set includes at least one SRS resource. The SRS resource set has different functions, and those functions include: beam management, antenna selection, a codebook, or a non-codebook. SRS resource sets used for the codebook and the non-codebook are respectively used for codebook-based physical uplink shared channel (PUSCH) transmission and non-codebook-based PUSCH transmission. A spatial relation may be configured in SRS resources. When the SRS resources are configured with the spatial relation, the UE needs to send the SRS resources according to the spatial relation of the SRS resources. That is, a sending filter parameter is determined. When the SRS resources are not configured with the spatial relation, the UE determines the sending filter parameter by itself. The sending filter parameter may be understood as a sending parameter required for forming a specific beam direction.

Figure 2:
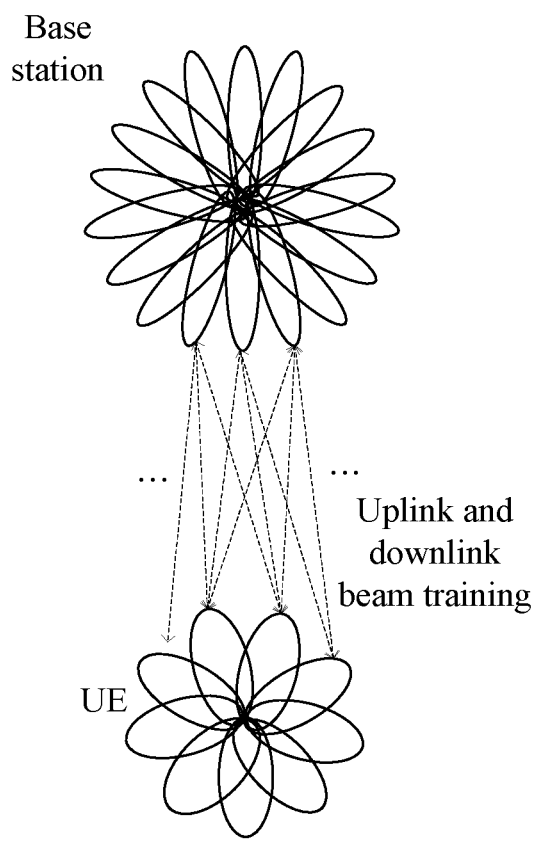
FIG. 2 is a diagram showing a beam relation between a base station and a UE.
Figure 3:
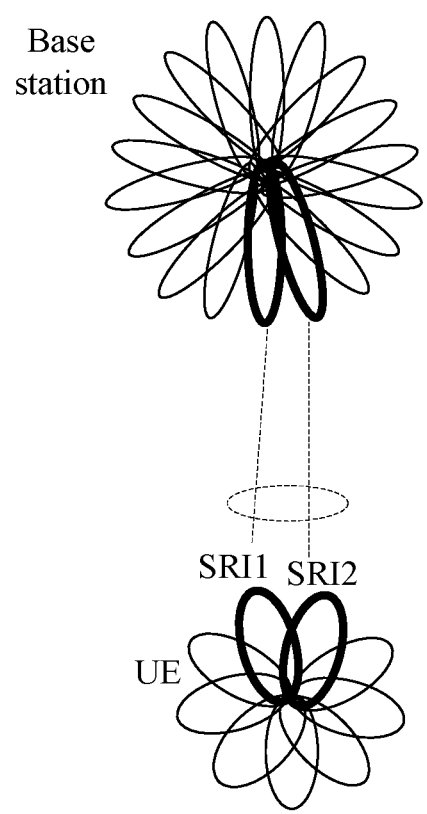
FIG. 3 is a diagram showing a beam relation between a base station and a UE after training.

FIG. 2 is a diagram showing a beam relation between a base station and a UE. As shown in FIG. 2, both the base station (e.g. gNB) and the UE support multiple beams, and uplink and downlink beam training (also called beam scanning or beam management) is required. The base station firstly configures an SRS resource set for beam management for the UE. No spatial relation is configured for an SRS resource, and the UE determines a sending filter parameter for an SRS resource indicator (SRI) by itself. Then, according to a result of beam training, the base station selects some better beam pairs as available/alternative beam pairs to configure an SRS resource set for a codebook or a non-codebook for the UE. The SRS resource set includes at least one SRS resource. A spatial relation of the SRS resource is expressed by an SRI of an SRS resource that has been sent by the UE, or a downlink reference signal indicator (including a reference signal resource index) or an SSB indicator (including an SSB index) that has been sent by the base station. At least one SRS resource corresponds to at least one of available or alternative beam pairs. FIG. 3 is a diagram showing a beam relation between a base station and a UE after training. As shown in FIG. 3, the SRS resource set includes two SRS resources, which are marked as SRI1 and SRI2, respectively.

Figure 4:
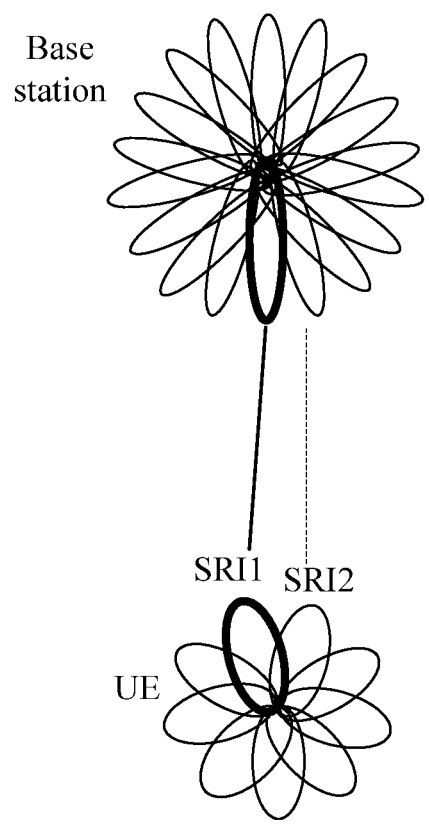
FIG. 4 is a diagram showing a base station and a UE selecting a beam for transmission among trained beams.

In a multi-beam system, for downlink transmission, the base station indicates the sending beam, and the UE knows the best receiving beam of the UE corresponding to a downlink sending beam of the base station according to its own measurement result. Which beam is selected for reception is up to the UE. For uplink transmission, the base station indicates the sending beam of the UE, and the base station determines a receiving beam of the uplink transmission by itself. Therefore, the receiving beam is transparent to a transmitting end. For uplink transmission, in addition to the sending beam, the base station also needs to configure the power control parameter for the UE so that the UE may determine the power of uplink transmission. The beam is expressed by using reference signal indication information. For PUSCH transmission, the base station indicates one or more SRS resources through a SRI field in downlink control information (DCI), and the UE sends the PUSCH using the same sending filter parameter as the SRS resources corresponding to the SRI, which may also be understood as using the same beam. The SRI indicated in the DCI is determined according to the SRS resource set configured by the base station. An SRS resource in SRS resource sets for a codebook and a non-codebook may be used as a reference for PUSCH transmission. FIG. 4 is a diagram showing a base station and a UE selecting a beam for transmission among trained beams. As shown in FIG. 4, the SRI field in the DCI scheduling the PUSCH indicates SRI1, and the UE uses the spatial relation of the SRS resources corresponding to SRI1 to determine a sending filter parameter of the PUSCH. A beam of physical uplink control channel (PUCCH) transmission is expressed by the spatial relation corresponding to the PUCCH resource.

In some techniques, the power control parameter for uplink transmission is related to the beam. A beam of PUSCH transmission is expressed in SRI. Through higher layer signaling (for example, radio resources control (RRC) signaling), the base station configures a power control parameter pool of the PUSCH and association of a value of the SRI field in the DCI with various power control parameters in the power control parameter pool. The base station schedules uplink transmission through the DCI, and the DCI includes the SRI field. Correlation between a value of the SRI field in the DCI configured by high layer signaling and various power control parameters in the power control parameter pool is checked through the value of the SRI field so as to obtain the power control parameter of the uplink transmission. A beam of PUCCH transmission includes a spatial relation index, and the base station configures the power control parameter pool of the PUCCH through high layer signaling (for example, RRC signaling). The base station also configures a spatial relation pool of the PUCCH through high layer signaling, where each spatial relation corresponds to one group of power control parameters in the power control parameter pool of the PUCCH. The base station activates the spatial relation in the spatial relation pool of the PUCCH for the PUCCH resource through medium access control (MAC) layer signaling. The base station schedules PUCCH transmission through the DCI and carries information in the DCI so as to determine PUCCH resources. The UE may obtain the PUCCH resources and spatial relations associated with the PUCCH resources and then obtain the power control parameter of the PUCCH transmission.

The power control parameter includes at least one or a combination of the following: 1. an open-loop power control parameter, where the open-loop power control parameter may be composed of a path loss adjustment coefficient alpha and/or a target power P0; 2. a reference signal (RS) parameter measured by a path loss (PL), also referred to as a path loss measurement parameter and including a reference signal resource index, where the path loss is obtained through a reference signal measurement result identified by the reference signal index; or 3. a closed-loop power control parameter. Where the closed-loop power control parameter includes at least one of: a closed-loop power control index (also referred to as a closed-loop power control state or a closed-loop identification) or a closed-loop power control quantity.

The power control parameter pool is a general term for different types of preconfigured power control parameter pools. For example, the power control parameter pool includes one or more of an open-loop power control parameter pool, a path loss measurement parameter pool, or a closed-loop power control parameter pool. The open-loop power control parameter pool includes at least one open-loop power control parameter, and the path loss measurement parameter pool includes at least one path loss measurement parameter. The closed-loop power control parameter pool includes at least one closed-loop power control parameter (for example, the closed-loop power control index).

Accordingly, a power control parameter index may accordingly include one or more of an open-loop power control parameter index, a path loss measurement parameter index, or a closed-loop power control index. The open-loop power control parameter index may be used for determining at least one open-loop power control parameter in a pre-configured open-loop power parameter pool, the path loss measurement parameter index may be used for determining at least one path loss measurement parameter in a preconfigured path loss measurement parameter pool, and the closed-loop power control index may be used for determining at least one closed-loop power control parameter in a pre-configured closed-loop power control parameter pool.

Figure 5:
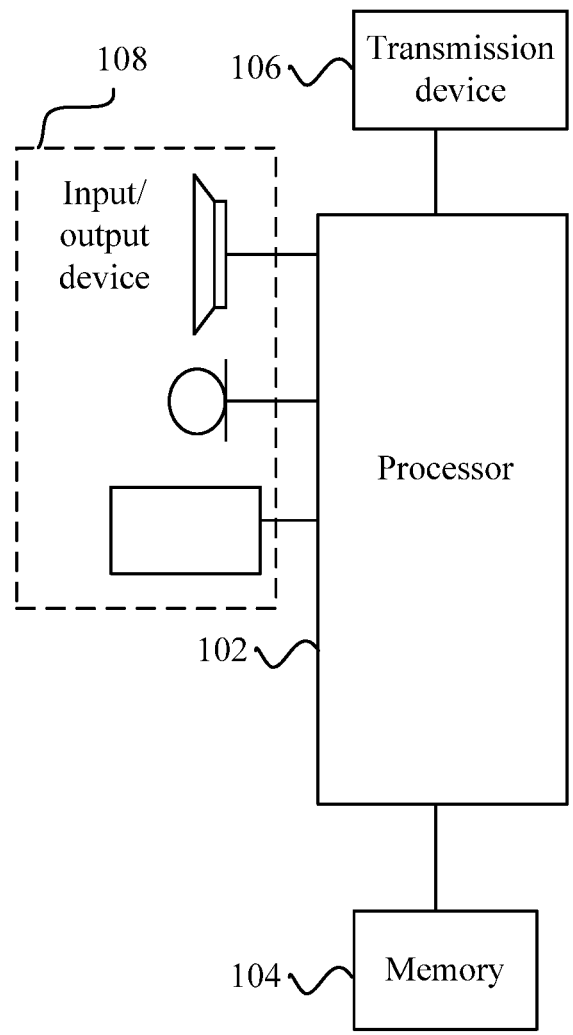
FIG. 5 is a diagram showing hardware structures of a mobile terminal operating in method steps of the present application according to an embodiment of the present disclosure.

The method embodiment provided in embodiment one of the present application may be performed in a mobile terminal, a computer terminal or other similar computing apparatuses. Taking the method to be performed in the mobile terminal as an example, FIG. 5 is a diagram showing hardware structures of a mobile terminal operating in method steps of the present application according to an embodiment of the present disclosure. As shown in FIG. 5, a mobile terminal 10 may include one or more (merely one is shown in FIG. 5) processors 102 (the processor 102 may include, but is not limited to, a processing apparatus such as a microprocessor control unit (MCU) or a field programmable gate array (FPGA)) and a memory 104 for storing data. Optionally, the mobile terminal may further include a transmission device 106 for implementing a communication function and an input/output device 108. It is to be understood by those of ordinary skill in the art that the structure shown in FIG. 5 is merely illustrative and not intended to limit the structure of the preceding mobile terminal. For example, the mobile terminal 10 may further include more or fewer components than the components shown in FIG. 5, or may have a configuration different from the configuration shown in FIG. 5.

The memory 104 may be configured to store a computer program, such as a software program and a module of application software, for example, the computer program corresponding to the power control method in the embodiment of the present disclosure. The processor 102 executes the computer program stored in the memory 104 to perform various functional applications and data processing, that is, to implement the preceding method. The memory 104 may include a high-speed random-access memory and may further include a nonvolatile memory such as one or more magnetic storage apparatuses, flash memories, or other nonvolatile solid-state memories. In some examples, the memory 104 may further include memories that are remotely disposed with respect to the one or more processors 102. These remote memories may be connected to the mobile terminal 10 via a network. Examples of the preceding network include, but are not limited to, the Internet, an intranet, a local area network, a mobile communication network, and a combination thereof.

The transmission device 106 being configured to receive or send data via a network. Specific examples of the preceding network may include a wireless network provided by a communication provider of the mobile terminal 10. In an example, the transmission device 106 includes a network interface controller (NIC) which may be connected to other network devices via a base station and thus can communicate with the Internet. In an example, the transmission device 106 may be a radio frequency (RF) module, which is used for communicating with the Internet in a radio way. The methods in the following embodiments one to four may all be performed in the hardware structure shown in FIG. 5.

Embodiment One

This embodiment provides a power control method. FIG. 6 is flowchart one of a power control method according to an embodiment of the present disclosure. As shown in FIG. 6, the method includes the following.

In S602, in the case where a first condition is satisfied, a first communication node determines a power control parameter of uplink transmission in a predetermined manner, or the first communication node determines the power control parameter of the uplink transmission autonomously.

In this embodiment, the first condition includes at least one of the following: 1) an uplink transmission resource being in an FR1 frequency band, where the uplink transmission resource in the FR1 frequency band may also be replaced by at least one of the following conditions: the first communication node being not configured with a type D QCL parameter or the first communication node being not configured with a spatial parameter; 2) the first communication node being in an RRC_CONNECTED mode; 3) the first communication node being not configured with the power control parameter; 4) the power control parameter of the first communication node being not existed; 5) the first communication node being configured with or indicated at least one power control parameter; 6) the first communication node being configured with or indicated more than one power control parameter; 7) scheduling information of the uplink transmission not including reference signal information or spatial relation information; 8) the first communication node being configured or instructed to use the predetermined manner to determine the power control parameter; 9) the first communication node being configured or instructed to determine the power control parameter autonomously; or 10) the first communication node being configured or instructed to allow autonomous determination of the power control parameter.

In S602, in the case where the first condition is satisfied, the first communication node determines the power control parameter of the uplink transmission in the predetermined manner, or the first communication node autonomously determines the power control parameter of the uplink transmission. In this manner, the first communication node may autonomously determine the power control parameter so as to solve the following problem in the related art: since a terminal does not distinguish between beams, when scheduling the uplink transmission, a base station cannot flexibly use change of a sending beam to change a corresponding power control parameter. Therefore, the flexibility of power control is improved.

The first communication node involved in the present application includes one of: a UE, a terminal, a user, or a station.

In an optional embodiment of the present application, the manner in which the first communication node determines the power control parameter autonomously may include: determining, by the first communication node, an RS set for measuring a PL, and determining power of the uplink transmission according to the RS set for measuring the PL.

The determining the power of the uplink transmission according to the RS set for measuring the PL includes: obtaining at least one PL according to part or all of RSs in the RS set for measuring the PL, and determining the power of the uplink transmission according to one or more minimum PL values among the at least one PL.

In this embodiment, the RS set for measuring the PL includes at least one of the following: 1) the RS set for measuring the PL including at least one RS for measuring the PL; 2) the RS for measuring the PL including at least one of: a synchronization signal block (SSB) or a channel state information reference signal (CSI-RS); or 3) the RS set for measuring the PL including all or part of an SSB set of a second communication node and/or all or part of the RS set for measuring the PL configured by the second communication node for the first communication node.

The second communication node involved in the present application includes one of the following: a base station, a nodeB (NB, eNB, and gNB), a network side, or an access point (AP).

In another optional implementation of this embodiment, the method in the present embodiment may further include the following.

In S604, in the case where a second condition is satisfied, the first communication node sends change information of the RS for measuring the PL to a second communication node.

In this embodiment, the second condition may include at least one of the following: 1) a difference between a minimum PL value in the RS set for measuring the PL and a PL being used being greater than a predetermined threshold; 2) an RS corresponding to the PL minimum value in the RS set for measuring the PL being different from an RS corresponding to the PL being used; 3) the RS corresponding to the minimum PL value in the RS set for measuring the PL not belonging to the RS set for measuring the PL configured by the second communication node; 4) the RS corresponding to the minimum PL value in the RS set for measuring the PL and an RS in the RS set for measuring the PL configured by the second communication node not having a QCL relation; 5) a capability of the first communication node supporting to send the change information of the RS for measuring the PL sent to the second communication node; or 6) the second communication node being configured to allow the first communication node to send the change information of the RS for measuring the PL to the second communication node.

Optionally, the change information of the RS for measuring the PL involved in this embodiment includes at least one of the following: 1) the difference between the PL minimum value in the RS set for measuring the PL and the PL being used in the RS for measuring the PL; 2) an indication in which the difference between the PL minimum value in the RS set for measuring the PL and the PL being used in the RS for measuring the PL exceeds a threshold; 3) a state indication in which the difference between the PL minimum value in the RS set for measuring the PL and the PL being used in the RS for measuring the PL exceeds the threshold; or 4) an RS recommended by the first communication node for measuring the PL.

Optionally, in this embodiment, the first communication node sends the change information of the RS for measuring the PL to the second communication node in one of the following manners: through a power headroom report (PHR); or through an independent PL or an MAC CE of the RS for measuring the PL. Where the MAC CE may be a MAC control element (CE).

Optionally, in this embodiment, the determining, by the first communication node, the power control parameter in the predetermined manner includes one of: 1) determining the power control parameter of the uplink transmission according to a CORESET; and determining the power control parameter of the uplink transmission according to a search space; where the CORESET refers to a control resource set; 2) determining the power control parameter of the uplink transmission according to a transmission configuration indicator (TCI) state with a minimum number in a TCI state set of an activated physical downlink shared channel (PDSCH); 3) determining the power control parameter of the uplink transmission according to a spatial relation associated with a sounding reference signal resource indicator (SRI) of the uplink transmission; or 4) determining the power control parameter of the uplink transmission according to a power control parameter of a sounding reference signal (SRS) resource set.

Optionally, the CORESET is determined according to one of the following characteristics: 1) a CORESET numbered 0; 2) a CORESET with a minimum number; 3) a CORESET associated with the search space; 4) a CORESET associated with a common search space; 5) a CORESET associated with a search space with a minimum number; 6) a CORESET monitored during a most recent predetermined period; or 7) a CORESET detected on a specific bandwidth part or carrier. Optionally, in the present application, the search space is determined according to one of the following characteristics: 1) a search space numbered 0; 2) a search space with a minimum number; 3) a common search space; 4) a search space associated with CORESET 0; 5) a search space monitored during a most recent predetermined period;

or 6) a search space of a physical downlink control channel (PDCCH) for scheduling PDSCH transmission including CORESET 0 information.

Optionally, in the present application, the determining the power control parameter of the uplink transmission according to the spatial relation associated with the SRI of the uplink transmission includes one of the following: in the case where the spatial relation associated with the SRI of the uplink transmission is a downlink reference signal, the downlink reference signal being an RS for measuring the PL of the uplink transmission; or in the case where the spatial relation associated with the SRI of the uplink transmission is a periodic downlink reference signal, the downlink reference signal being the RS for measuring the PL of the uplink transmission.

Optionally, in this embodiment, the power control parameter of the SRS resource set includes one of the following: 1) the power control parameter of the SRS resource set associated with the uplink transmission; 2) the power control parameter of the SRS resource set for a transmission configuration parameter of the uplink transmission; 3) the power control parameter of the SRS resource set for beam management; 4) the power control parameter of the SRS resource set for antenna switching; or 5) the power control parameter of the SRS resource set for positioning.

Embodiment Two

This embodiment provides a power control method. FIG. 7 is flowchart two of a power control method according to an embodiment of the present disclosure. As shown in FIG. 7, the method includes the following.

In S702, in the case where a third condition is satisfied, a first communication node reports a measurement result to a second communication node.

In S704, the first communication node determines power of uplink transmission according to a power control parameter sent by the second communication node.

Optionally, in this embodiment, the third condition includes at least one of the following: a difference between a minimum PL value in an RS set for measuring a PL and a PL of a path loss measurement reference signal being used being greater than a preset threshold value; or a time interval between a current report and a previous report exceeding a preset time period. Optionally, the measurement result in this embodiment includes at least one of the following: 1) the difference between the PL minimum value in the RS set for measuring the PL and the PL being used in the RS for measuring the PL; 2) an indication in which the difference between the PL minimum value in the RS set for measuring the PL and the PL being used in the RS for measuring the PL exceeds a threshold; 3) a state indication in which the difference between the PL minimum value in the RS set for measuring the PL and the PL being used in the RS for measuring the PL exceeds the threshold; or 4) an optimal RS recommended by the first communication node for measuring the PL.

Optionally, the manner in which the first communication node reports the measurement result includes at least one of the following: through a PHR; through an independent PL or an MAC CE of a path loss measurement reference signal; or through a channel state information (CSI) report. In this embodiment, the first condition includes at least one of the following: 1) an uplink transmission resource being in an FR1 frequency band; 2) the first communication node being in an RRC_CONNECTED mode; 3) the first communication node being not configured with the power control parameter; 4) the power control parameter of the first communication node being not existed; 5) the first communication node being configured with or indicated at least one power control parameter; 6) the first communication node being configured with or indicated more than one power control parameter; 7) scheduling information of the uplink transmission not including spatial relation information; 8) the first communication node being configured or instructed to use the predetermined manner to determine the power control parameter; 9) the first communication node being configured or instructed to determine the power control parameter autonomously; or (10) the first communication node being configured or instructed to allow autonomous determination of the power control parameter.

In an optional embodiment of the present application, the manner in which the first communication node determines the power control parameter autonomously may include: determining, by the first communication node, an RS set for measuring a PL, and determining power of the uplink transmission according to the RS set for measuring the PL.

The determining the power of the uplink transmission according to the RS set for measuring the PL includes: obtaining at least one PL according to part or all of RSs in the RS set for measuring the PL, and determining the power of the uplink transmission by using one or more minimum PL values among the at least one PL.

In this embodiment, the RS set for measuring the PL includes at least one of the following: 1) the RS set for measuring the PL including at least one RS for measuring the PL; 2) the RS for measuring the PL including at least one of the following: a synchronization signal block (SSB) or a channel state information reference signal (CSI-RS); or 3) the RS set for measuring the PL including all or part of an SSB set of a second communication node and/or all or part of the RS set for measuring the PL configured by the second communication node for the first communication node.

In another optional implementation of this embodiment, the method in the present embodiment may further include the following.

In S604, in the case where a second condition is satisfied, the first communication node sends change information of the RS for measuring the PL to a second communication node.

In this embodiment, the second condition may include at least one of the following: 1) a difference between a minimum value among at least one PL currently measured and a PL being used being greater than a predetermined threshold; 2) an RS corresponding to the minimum value among the at least one PL currently measured being different from an RS corresponding to the PL being used; 3) the RS corresponding to the minimum value among the at least one PL currently measured not belonging to the RS set for measuring the PL configured by the second communication node; 4) the RS corresponding to the minimum value among the at least one PL currently measured and an RS in the RS set for measuring the PL configured by the second communication node not having a QCL relation; 5) a capability of the first communication node supporting to send the change information of the RS for measuring the PL sent to the second communication node; or 6) the second communication node being configured to allow the first communication node to send the change information of the RS for measuring the PL to the second communication node.

Optionally, the change information of the RS for measuring the PL involved in this embodiment includes at least one of: 1) a difference between an optimal RS for measuring the PL and a PL being used in the RS for measuring the PL; 2)

an indication in which the difference between the optimal RS for measuring the PL and the PL being used in the RS for measuring the PL exceeds a threshold; 3) a state indication in which the difference between the optimal RS for measuring the PL and the PL being used in the RS for measuring the PL exceeds the threshold; or 4) an RS recommended by the first communication node for measuring the PL.

Optionally, in this embodiment, the first communication node sends the change information of the RS for measuring the PL to the second communication node in one of the following manners: through an MAC CE of a PHR; or through an independent PL or an MAC CE of the RS for measuring the PL.

Optionally, in this embodiment, determining, by the first communication node, the power control parameter in the predetermined manner includes one of the following: 1) determining the power control parameter of the uplink transmission according to a CORESET; and determining the power control parameter of the uplink transmission according to a search space; 2) determining the power control parameter of the uplink transmission according to a TCI state with a minimum number in a TCI state set of an activated PDSCH; 3) determining the power control parameter of the uplink transmission according to a spatial relation associated with an SRI of the uplink transmission; or 4) determining the power control parameter of the uplink transmission according to a power control parameter of an SRS resource set.

Optionally, the CORESET is determined according to one of the following characteristics: 1) a CORESET numbered 0; 2) a CORESET with a minimum number; 3) a CORESET associated with the search space; 4) a CORESET associated with a common search space; 5) a CORESET associated with a search space with a minimum number; 6) a CORESET monitored during a most recent predetermined period; or 7) a CORESET detected on a specific bandwidth part or carrier. Optionally, in the present application, the search space is determined according to one of the following characteristics: 1) a search space numbered 0; 2) a search space with a minimum number; 3) a common search space; 4) a search space associated with CORESET 0; 5) a search space monitored during a most recent predetermined period; or 6) a search space of a PDCCH for scheduling PDSCH transmission including CORESET 0 information.

Optionally, in the present application, determining the power control parameter of the uplink transmission according to the spatial relation associated with the SRI of the uplink transmission includes one of the following: in the case where the spatial relation associated with the SRI of the uplink transmission is a downlink reference signal, the downlink reference signal is an RS for measuring the PL of the uplink transmission; or in the case where the spatial relation associated with the SRI of the uplink transmission is a periodic downlink reference signal, the downlink reference signal is the RS for measuring the PL of the uplink transmission.

Optionally, in this embodiment, the power control parameter of the SRS resource set includes one of: 1) the power control parameter of the SRS resource set associated with the uplink transmission; 2) the power control parameter of the SRS resource set for a transmission configuration parameter of the uplink transmission; 3) the power control parameter of the SRS resource set for beam management; 4) the power control parameter of the SRS resource set for antenna switching; or 5) the power control parameter of the SRS resource set for positioning.

Embodiment Three

This embodiment provides a power control method. FIG. 8 is flowchart three of a power control method according to an embodiment of the present disclosure. As shown in FIG. 8, the method includes the following.

In S802, a first communication node receives a power control parameter sent by a second communication node.

In S804, the first communication node determines power of uplink transmission according to the power control parameter.

The power control parameter is determined according to at least one of the following: an effective time or a path loss mode.

The effective time is determined according to at least one of the following: an occasion when the power control parameter is received; delaying a first time; or a sending occasion of hybridautomatic repeat-request acknowledgement (HARQ-ACK) signaling associated with a physical downlink shared channel (PDSCH) carrying the power control parameter.

A manner of determining the power control parameter according to the effective time includes one of the following.

1) In the case where a path loss measurement reference signal included in power control parameter information belongs to an RS set for measuring a PL of the first communication node, the power control parameter is effective after the power control parameter is received or after the HARQ-ACK signaling associated with the PDSCH carrying the power control parameter is sent.

2) In the case where the path loss measurement reference signal included in the power control parameter information does not belong to the RS set for measuring the PL of the first communication node, the power control parameter is effective after the first time is delayed or after the power control parameter is received and delayed for the first time or after the HARQ-ACK associated with the PDSCH carrying the power control parameter is sent and delayed for the first time.

The path loss mode involved in this embodiment includes a high layer filtering path loss mode or a physical layer filtering path loss mode.

In this embodiment, the path loss mode is determined according to at least one of the following: a physical layer filtering path loss capability of the first communication node; or the path loss mode configured or indicated by the second communication node.

The high layer filtering path loss mode, also referred to as a Layer 3 (L3) filtering path loss mode, is a mode in which a PL is determined according to reference signal receiving power (RSRP) of the high layer filtering. The physical layer filtering path loss mode, also referred to as a Layer 1 (L1) filtering path loss mode, is a mode in which a PL is determined according to the RSRP of the physical layer filtering.

In this embodiment, it is feasible that the first communication node reports to the second communication node whether the first communication node has a capability of supporting a physical layer filtering path loss. Alternatively, the second communication node configures the path loss mode through high layer signaling or indicates the path loss mode to the first communication node through MAC layer signaling or physical layer signaling.

In the case where the first communication node has the capability of supporting the physical layer filtering path loss, the second communication node may configure or indicate the path loss mode of the first communication node to be the high layer path loss mode or the physical layer path loss mode.

In the case where the path loss mode of the first communication node is the physical layer path loss mode, determining the power control parameter according to the effective time includes one of: the power control parameter being effective after the first time is delayed; the power control parameter being effective after the power control parameter is received and delayed for the first time; or the power control parameter being effective after the HARQ-ACK signaling associated with the PDSCH carrying the power control parameter is sent and delayed for the first time.

The first communication node receives the power control parameter in the following manner: the second communication node carries the power control parameter through RRC signaling, or the second communication node carries the power control parameter through the MAC CE.

In this embodiment, the first time is determined according to at least one of: a path loss measurement parameter indicated by power control parameter information received at least once; a predetermined duration; a duration configured by the second communication node; or a duration determined according to a capability of the first communication node.

Power control parameter information being received or being effective before a second time when the uplink transmission starts is used for determining a transmit power of the uplink transmission.

The second time is determined by a sending occasion or a receiving occasion of the DCI that schedules or activates the uplink transmission, or the second time is determined by the capability of the first communication node. Determining the second time by the sending occasion or the receiving occasion of the DCI that schedules or activates the uplink transmission includes that the second time includes a duration from the sending occasion or the receiving occasion of the DCI that schedules or activates the uplink transmission to a starting time of the uplink transmission.

Embodiment Four

This embodiment provides a sending method for uplink transmission. The method includes determining a sending type of uplink transmission according to reference signal information or a predetermined manner.

The sending type of the uplink transmission includes a first type and a second type, and a time interval between the uplink transmission of the first type and the uplink transmission of the second type is greater than or equal to a first time offset.

In this embodiment, the uplink transmission of the first type and the uplink transmission of the second type do not overlap in a time domain. A time sequence of the uplink transmission of the first type and the uplink transmission of the second type is not limited. The time interval between the uplink transmission of the first type and the uplink transmission of the second type refers to a time interval between an ending time of the earlier transmission of the two transmissions and a starting time of the later transmission of the two transmissions.

Optionally, in this embodiment, the first time offset is determined according to at least one of the following manners: a capability of the first communication node; a predefined value; or a second communication node configuration value.

The first time offset determined by the capability of the first communication node includes an occasion when the first communication node completes the switching of a flexible antenna in different frequency bands.

The first time offset determined by the predefined value includes one of: 0 microseconds (µs), 35 µs, 140 µs, or 900 µs.

The second communication node configuration value includes a value of the first communication node of which the second communication node informs the UE through high layer signaling, MAC layer signaling, or physical layer signaling. Generally, the second communication node indicates a value from one set. For example, the set includes 0 µs, 35 µs, 140 µs, or 900 µs, and one value of the set may be configured by the second communication node of the base station.

Optionally, in this embodiment, the sending type includes at least one of the following characteristics: a maximum number of ports for the uplink transmission of the first type being less than or equal to a maximum number of ports for the uplink transmission of the second type; or maximum power for the uplink transmission of the first type being less than maximum power for the uplink transmission of the second type.

In a second frequency band, the maximum number of ports for the uplink transmission of the first type is less than or equal to the maximum number of ports for the uplink transmission of the second type. In the second frequency band, the maximum power for the uplink transmission of the first type is less than the maximum power for the uplink transmission of the second type, and a first frequency band carries the uplink transmission of the first type and cannot carry the uplink transmission of the second type.

Optionally, the first frequency band is lower in frequency than the second frequency band.

The uplink transmission of the first type is associated with a first case, where characteristics of the first case include at least one of the following: a flexibly configurable antenna operates in the first frequency band; transmission may be performed in the first frequency band and the second frequency band in parallel; a number of ports for transmission in the second frequency band is not greater than 1; a power level of the first communication node UE operating in the first frequency band is 3; a power level of the first communication node UE operating in the second frequency band is 3; maximum power of the first communication node UE operating in the first frequency band is 23 dBm; or maximum power of the first communication node UE operating in the second frequency band is 23 dBm.

In an embodiment, the uplink transmission of the first type is associated with a second case, and characteristics of the second case include at least one of the following: the flexibly configurable antenna operates in the second frequency band; transmission cannot be performed in the first frequency band; the number of ports for transmission in the second frequency band is greater than or equal to 1; maximum power for the second frequency band may reach 26 dBm; or a power level of the first communication node UE operating in the second frequency band in the second case is 2.

Optionally, a correspondence between an antenna port and a transmit antenna is determined according to at least one of the following: an antenna port numbered 0 being corresponded to a fixed transmit antenna; an antenna port numbered 1 being corresponded to a flexible transmit antenna; N1 antenna ports with a minimum antenna port number being corresponded to fixed M1 transmit antennas, where N1 and M1 are both non-zero integers, and N1 is less than or equal to M1; N2 antenna ports with a maximum antenna port number being corresponded to flexibly configured M2 transmit antennas, where N2 and M2 are both non-zero integers, and N2 is less than or equal to M2; or the antenna port numbered 0 being corresponded to the fixed transmit antenna and a flexibly configured transmit antenna.

The correspondence between the antenna port and the transmit antenna is determined according to at least one of the following: an antenna port of the first frequency band operating in the first case being corresponded to the flexibly configured transmit antenna; an antenna port of the second frequency band operating in the first case being corresponded to the fixed transmit antenna; an antenna port numbered 0 of the second frequency band operating in the second case being corresponded to the fixed transmit antenna; an antenna port numbered 1 of the second frequency band operating in the second case being corresponded to the flexibly configured transmit antenna; N1 antenna ports with the minimum antenna port number of the second frequency band operating in the second case being corresponded to M1 fixed transmit antennas, where N1 and M1 are non-zero integers, and N1 is less than or equal to M1; N2 antenna ports with the maximum antenna port number of the second frequency band operating in the second case being corresponded to M2 flexibly configured transmit antennas, where N2 and M2 are non-zero integers, and N2 is less than or equal to M2; or an antenna port numbered 0 of the second frequency band operating in the second case being corresponded to the fixed transmit antenna and the flexibly configured transmit antenna.

The first communication node sends the correspondence between the antenna port and the transmit antenna to the second communication node.

Sending, by the first communication node, the correspondence between the antenna port and the transmit antenna to the second communication node includes one of: sending, by the first communication node, a correspondence between each antenna port and the transmit antenna to the second communication node; or sending, by the first communication node, a correspondence between the fixed transmit antenna and the antenna port to the second communication node.

Optionally, in this embodiment, determining the sending type of the uplink transmission according to the predetermined manner includes at least one of: determining the sending type of the uplink transmission according to a frame structure pattern; determining the sending type of the uplink transmission according to a time configuration parameter of a first case and/or a second case; determining the sending type of the uplink transmission according to the first case and/or the second case turned on or off; determining the sending type of the uplink transmission according to a default case; or determining the sending type of the uplink transmission according to a bandwidth part (BWP) of the transmission.

In the case where the uplink transmission is transmission in the first frequency band, the sending type of the uplink transmission is the first type; and in the case where the uplink transmission is transmission in the second frequency band and a number of non-zero power transmission ports of the uplink transmission is greater than 1, the sending type of the uplink transmission is the second type.

Optionally, the uplink transmission in this embodiment includes at least one of: SRS transmission, PUSCH transmission, or PUCCH transmission.

The reference signal information includes one of: an SRS resource, an SRS resource set, or an SRS resource indicator.

Optionally, in this embodiment, the reference signal information includes at least one of the following characteristics: the reference signal information being associated with the first type and/or the second type; or the reference signal information being associated with a first case and/or a second case.

The reference signal information being associated with the first case and/or the second case includes one of the following: the SRS resource being associated with the first case and/or the second case; or the SRS resource set being associated with the first case and/or the second case. Optionally, in this embodiment, association of the reference signal information with the first case and/or the second case is determined according to one of the following: number of the reference signal information; a function of the reference signal information; or preconfigured information. Association of the reference signal information with the first type and/or the second type is determined according to one of the following: number of the reference signal information; a function of the reference signal information; or preconfigured information.

Different SRS resources of the SRS resource set, which are respectively associated with the first case (or the first type) and the second case (or the second type), have same time domain parameters. Different SRS resources of the SRS resource set, which are respectively associated with the first case (or the first type) and the second case (or the second type), have same frequency domain parameters.

All SRS resources with a port number of 1 in the SRS resource set correspond to fixed transmit antennas, and N3 SRS resources with the minimum number with a port number of 1 in the SRS resource set correspond to M3 fixed transmit antennas. Where N3 and M3 are non-zero integers, and N3 is less than or equal to M3.

Optionally, in this embodiment, determining the sending type of the uplink transmission according to the reference signal information or the predetermined manner includes at least one of the following: the sending type of SRS transmission associated with the first case being the first type; the sending type of the SRS transmission associated with the second case being the second type; the sending type of PUSCH transmission with reference to the reference signal information associated with the first case being the first type; the sending type of the PUSCH transmission with reference to the reference signal information associated with the second case being the second type; scheduling information includes that the sending type of the PUSCH transmission associated with the reference signal information of the first case being the first type; scheduling information includes that the sending type of the PUSCH transmission associated with the reference signal information of the second case being the second type; the sending type of the SRS transmission associated with different SRS resources of the first case and the second case of an SRS resource set being the second type; in the case where the sending type of the SRS transmission associated with the second case is the first type, only sending the SRS transmission whose number of ports are supported by the first type is sent, wherein the number of ports of the SRS transmission is ranged in an ascending order; the uplink transmission of the first type and the uplink transmission of the second type referring to the reference signal information being associated with the first case and the reference signal information associated with the second case, respectively; or the uplink transmission of the first type and the uplink transmission of the second type respectively referring to the reference signal information associated with the second case.

For example, the number of ports supported by the SRS transmission associated with the second case is 2, the number of ports supported by the first type is assumed to be 1, the SRS transmission associated with the second case only sends the SRS transmission of port 0.

Determining the sending type of the uplink transmission according to the reference signal information or the predetermined manner further includes at least one of the following: the sending type of the PUCCH transmission with reference to the reference signal information associated with the first case being the first type; or the sending type of the PUCCH transmission with reference to the reference signal information associated with the second case being the second type.

The PUSCH transmission with reference to the reference signal information associated with the first case refers to scheduling information or grant information of the PUSCH transmission, or the DCI including the scheduling information including the reference signal information associated with the first case.

The PUCCH transmission associated with the reference signal information associated with the first case means that spatial relation information of the PUCCH transmission includes the reference signal information.

Referenced reference signal information of the uplink transmission means that the scheduling information of the uplink transmission includes the reference signal information. That is, the sending parameter of the uplink transmission is determined by referenced reference signal information. The sending parameter includes at least one of: an antenna port, a filter parameter, or a precoding parameter.

Optionally, in this embodiment, the time interval between the uplink transmission of the first type and the uplink transmission of the second type being greater than or equal to the first time offset includes one of the following:

In the case where the uplink transmission of the first type and the uplink transmission of the second type belong to a same SRS resource set, determining the first time offset according to a time offset configured in the SRS resource set or a predetermined value; or in the case where the uplink transmission of the first type and the uplink transmission of the second type belong to different SRS resource sets, determining the first time offset according to the predetermined value or a BWP or a component carrier (CC) time offset of SRS transmission or according to a time offset of a first communication node of the UE, where in the case where different SRS resource sets are used for distinguishing the first case and the second case, the second communication node of the base station needs to indicate an SRS resource set ID to the first communication node UE.

This embodiment is described hereinafter in conjunction with specific embodiments.

Figure 9:
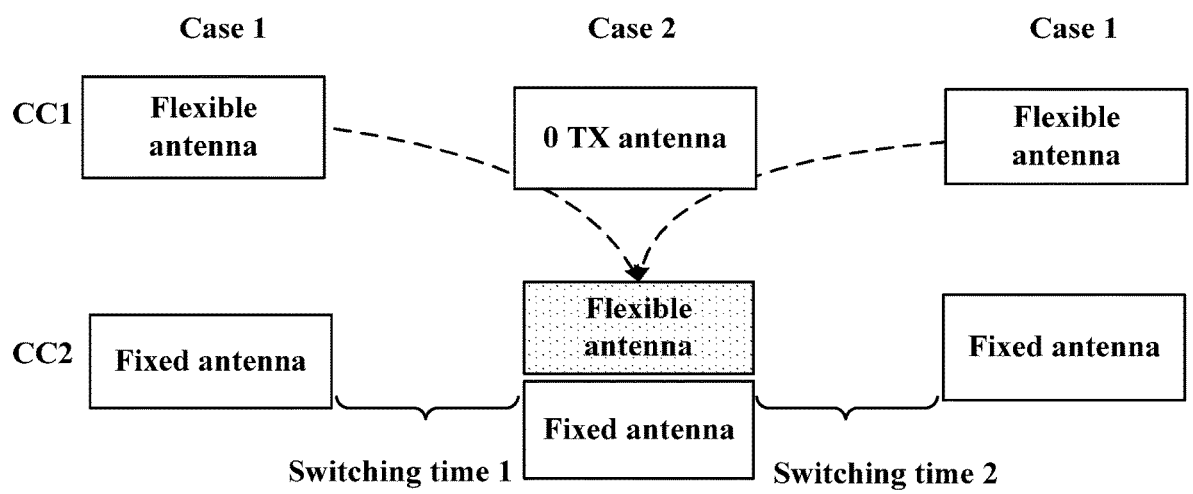
FIG. 9 is a diagram showing deploying two transmissions on two frequency bands according to an embodiment of the present disclosure.

As shown in FIG. 9, two transmissions are deployed in two frequency bands, and carrier aggregation (CA) is used as an example for description here, where CC1 and CC2 represent two frequency bands. CC is a component carrier in CA. CC1 is a frequency band with a lower frequency (referred to as a lower frequency band for short), and CC2 is a frequency band with a higher frequency (referred to as a higher frequency band for short). Generally, one antenna is sufficient for transmission in the lower frequency band, while multiple antennas, for example, two antennas, may be used for transmission in the higher frequency band for better performance. In this manner, the UE needs three antennas to achieve independent transmission of the preceding two frequency bands. In fact, from the perspective of cost reduction, the UE only needs to be configured with two antennas, one of which is fixed in one frequency band (referred to as a fixed antenna for short), for example, the higher frequency band CC2, and the other one of which is a flexibly configured antenna (referred to as a flexible antenna for short) and may be time-divisionally switched between CC1 and CC2. There are two cases in the time domain, which are the first case and the second case and also referred to as case 1 and case 2. The first case and the second case may also be referred to as a case numbered 1 and a case numbered 2, respectively. In the first case, the flexibly configurable antenna operates in the lower frequency band, and independent transmission of one antenna in the lower frequency band and one antenna in the higher frequency band is feasible. In the second case, the flexibly configurable antenna operates in the higher frequency band, transmission of this antenna and transmission of a fixedly configured antenna are performed at the same time, and in this case, the lower frequency band has no antenna available and transmission cannot be performed on the lower frequency band.

In addition to the case where the preceding two frequency bands are CC1 and CC2, the two frequency bands may also be replaced by other scenarios, for example, the lower frequency band is long term evolution (LTE), and the higher frequency band is NR. Alternatively, the lower frequency band is a supplementary uplink (SUL), and the higher frequency band is an uplink (UL) (also referred to as a non-SUL UL and a normal UL).

The UE operates in the first case when the UE needs to send transmission in a low frequency band.

The UE operates in the second case when the UE needs to use two ports for transmission in a high frequency band, or when the UE needs to send transmission with high power. If there are no requirements for another case, the UE keeps operating in the current case.

In the preceding scenario, a relation among the first case, the second case, the SRS transmission and the PUSCH transmission is not clear. Description is made below.

Number of a case to which a transmission period belongs, that is, the first case or the second case, is determined according to at least one of the following: a predetermined manner.

Determining number of the case to which the transmission period belongs according to the predetermined manner includes one of the following: time parameters of the first case and the second case configured by the base station.

In an implementation of this embodiment, a period of the first case and a period of the second case are repeated in a periodic manner. For example, the base station configures the period of the first case, the period of the second case, and the time or proportion of the first case or the second case in the period.

In another implementation of this embodiment, a transmission period is determined to be belonged to the first case and the second case according to a preconfigured frame structure pattern.

The base station turns on or off the first case, and/or the base station turns on or off the second case.

1) The base station only configures or indicates the first case or the second case being turned on or being turned off. In this case, all time periods may only belong to the first case or the second case. That is, in the case where the first case is turned off, the second case is turned on; and in the case where the first case is turned on, the second case is turned off 2) The base station configures or indicates the first case and the second case being turned on or being turned off.

The two cases cannot be turned on at the same time, but can be turned off at the same time.

In a default case, in the case where an interval between an ending time of the PDCCH including scheduling information of the transmission and a starting time of the transmission is less than a predetermined threshold, that is, a capability of switching to a case associated with the transmission before the starting time of the transmission is not achieved, then the default case is used for determining number of a case of the transmission period, such as the first case.

For the BWP, different cases are associated with different bandwidth parts (BWPs). The case of uplink transmission is indicated by different BWP IDs.

For number of a case associated with the transmission, number of a case to which the transmission period belongs is determined according to number of the case associated with the transmission.

1) Number associated with the transmission is consistent with number of the case to which the transmission period belongs.

For example, when the UE sends the SRS transmission, in the case where the SRS transmission is associated with the first case, a time period occupied by the SRS transmission belongs to the first case.

For example, when the UE sends the PUSCH transmission, in the case where the PUSCH transmission is associated with the second case, a time period occupied by the PUSCH transmission belongs to the second case.

2) In the case where an interval between an ending time of the PDCCH including scheduling information of the transmission and a starting time of the transmission is greater than or equal to a predetermined threshold, that is, a capability of switching to a case associated with the transmission before the starting time of the transmission is not achieved, then number associated with the transmission is consistent with number of a case associated with the transmission period. The UE determines association of the reference signal with the first case and/or the second case. The reference signal includes at least one of: an SRS, a CSI-RS, a DMRS, or an SSB. The SRS is used as an example for description below.

The SRS information includes one of the following: an SRS resource, an SRS resource set, or an SRS resource indicator.

Association of the SRS information with the first case and/or the second case is determined. Determining the association of the SRS information with the first case and/or the second case includes one of the following.

A function of configuring the SRS information by the base station is the first case and/or the second case, that is, the SRS information is associated with the first case and/or the second case, respectively.

A function of the SRS information includes at least one of: the first case or the second case.

For example, in the case where the SRS information is the SRS resource set, and a function of the SRS resource set is configured to be the first case or the second case, the SRS resource set is associated with the first case or the second case, respectively. In the case where the SRS information is the SRS resource, and a function of the SRS resource is configured to be the first case or the second case, the SRS resource is associated with the first case or the second case, respectively.

The association of the SRS information with the first case and/or the second case is determined according to number of the SRS information.

1) SRS information with a minimum number is associated with the first case, and SRS information with a maximum number is associated with the second case.

For example, the SRS resource set has two SRS resources, numbered 0 and 1, respectively. In the case where the reference signal information is the SRS resource, the SRS resource numbered 0 is associated with the first case, and the SRS resource numbered 1 is associated with the second case. For example, the SRS resource set has three SRS resources, numbered 0, 1, and 2, respectively, then the SRS resource numbered 0 is associated with the first case, and the SRS resources numbered 1 and 2 are associated with the second case. The SRS resource numbered 0 is configured with one port, and the SRS resource numbered 1 is configured with two ports.

2) The SRS information with the minimum number is associated with the second case, and the SRS information with the maximum number is associated with the first case.

The association of the SRS information with the first case and/or the second case is determined according to preconfigured information.

For example, in the case where the SRS information is the SRS resource set, the SRS resource set is configured by higher layer signaling to be associated with the first case or the second case. In the case where the SRS information is the SRS resource, the SRS resource is configured by higher layer signaling to be associated with the first case or the second case.

The UE determines a sending mode of the SRS transmission according to association of the SRS with the first case and/or the second case. Determining, by the UE, the sending mode of the SRS transmission according to the association of the SRS with the first case and/or the second case includes one of the following.

The SRS transmission is sent only in a time period of a case associated with the SRS. Sending the SRS transmission only in the time period of the case associated with the SRS includes one of the following.

In the case where number of a case to which a transmission period belongs is determined according to a predetermined method, the SRS associated with the first case is sent in a time period of the first case, and the SRS associated with the second case is sent in a time period of the second case. In the case where number of the case to which the transmission period belongs is determined according to number of a case associated with the transmission, in the case where an interval between an end time of the PDCCH including scheduling information of the SRS transmission and a starting time of the SRS transmission is greater than or equal to a predetermined threshold, that is, a capability of switching to a case associated with the SRS transmission before the starting time of the SRS transmission is achieved, then number associated with the SRS transmission is consistent with number of a case to which an SRS transmission period belongs; and in the case where the interval between the end time of the PDCCH including scheduling information of the transmission and the starting time of the SRS transmission is less than the predetermined threshold, that is, the capability of switching to the case associated with the SRS transmission before the starting time of the transmission is not achieved, then the default case is used for determining number of a case of the SRS transmission period, such as the first case.

In the case where number of the case to which the transmission period belongs is determined according to number of the case associated with the transmission, a time offset between the SRS resource associated with the first case and the SRS resource associated with the second case in the SRS resource set is predetermined or configured by RRC signaling.

Sending of the SRS transmission associated with the first case in the time period of the second case is supported.

In the case where the UE is in the second case, the SRS transmission associated with the first case can be sent without switching to the first case. The second case may be a case to which a time period of the transmission determined according to the predetermined manner or number of the case associated with the transmission belongs.

For example, in the case where an SRS resource set is configured with SRS resource 1 and SRS resource 2 that are associated with the first case and the second case, respectively. In the case where the UE is in the first case, only SRS resource 1 is sent; and in the case where the UE is in the second case, both SRS resource 1 and SRS resource 2 may be sent without switching to the first case to send SRS resource 1.

For example, in the case where an SRS resource set is configured with SRS resource 1, SRS resource 2, and SRS resource 3, SRS resource 1 is associated with the first case and supports 1 port, SRS resource 2 is associated with the second case and supports 1 port, and SRS resource 3 is associated with the second case and supports 2 ports. In the case where the UE is in the first case, only SRS resource 1 is sent. In the case where the UE is in the second case, SRS resource 1, SRS resource 2, and SRS resource 3 may be sent without switching to the first case to send SRS resource 1.

An SRS sent only in a time period of the second case is supported, that is, the SRS resource associated with the first case is not sent.

For the PUSCH transmission associated with the first case, one of the following is used for determining a sending parameter for the PUSCH transmission associated with the first case.

A measurement result of part of ports in the SRS that is associated with the second case and sent in the time period of the second case.

The part of the ports in the SRS associated with the second case refers to ports corresponding to ports of the SRS associated with the first case. For example, SRS resource 1 is associated with the second case and configured with 2 ports, where port 0 being corresponded to the port of the SRS associated with the first case so that a measurement result of port 0 in the 2 ports of SRS resource 1 may be used as a measurement result of the SRS associated with the first case.

A correspondence between part of ports in the SRS associated with the second case and the ports of the SRS associated with the first case being predefined or determined by the UE and reported to the base station.

Antennas of part of ports in the SRS that is associated with the second case and sent in the time period of the second case are consistent with antennas of ports of the SRS associated with the first case. For example, SRS resource 1 is associated with the second case and configured with 2 ports, where port 0 being corresponded to a fixed antenna, port 1 being corresponded to a flexibly configured antenna, and the SRS resource associated with the first case also being corresponded to a fixed antenna. Therefore, the measurement result of port 0 of SRS resource 1 may be used as the measurement result of the SRS associated with the first case.

A correspondence between ports and antennas is described below.

In manner 1, a fixedly configured antenna being corresponded to port 0, and a flexibly configured antenna being corresponded to port 1.

In manner 2, a fixedly configured antenna and a flexibly configured antenna correspond to port 0.

In manner 3, a correspondence among a fixedly configured antenna and a flexibly configured antenna and number of a port is flexibly configured.

A measurement result of the SRS that is associated with the first case and sent in the time period of the second case.

A measurement result of the SRS that is associated with the first case and sent in the time period of the first case.

For the PUSCH transmission associated with the first case, the closest result to the PUSCH transmission among the preceding results is used for determining the sending parameter of the PUSCH transmission associated with the first case.

1) The SRS resource may not be associated with number of a case, and the measurement results of the SRS are selected according to the first case or the second case to which the PUSCH transmission belongs. For example, the PUSCH transmission transmitted in the time period of the first case uses the measurement result of port 0 of the SRS. The PUSCH transmission transmitted in the time period of the second case uses a measurement result of the port of the PUSCH corresponding to the SRS. The port of the PUSCH may be one virtual port, or one or two of two ports.

2) Time-frequency domain resources of multiple SRS resources associated with different case numbers are the same, only the SRS resource of one port is sent in the time period of the first case, and the SRS resource of all ports is sent in the time period of the second case.

In the case where full power transmission mode 1 is supported, the SRS resource set includes two SRS resources that are configured with 1 port and 2 ports, respectively. The two SRS resources are associated with the first case and the second case, respectively.

In the case where full power transmission mode 2 is supported, the SRS resource set includes two SRS resources that are configured with 1 port and 1 port, respectively. The two SRS resources are associated with the first case and the second case, respectively.

In the case where a multi-beam and multi-spatial relation or a multi-antenna panel is supported, in the case where the full power transmission mode 1 is supported, in the SRS resource set, each beam or spatial relation or an SRS resource group associated with an antenna panel includes 2 SRS resources that are configured with 1 port and 2 ports, respectively. The 2 SRS resources are associated with the first case and the second case, respectively.

In the case where a multi-beam and multi-spatial relation or a multi-antenna panel is supported, in the case where the full power transmission mode 2 is supported, in the SRS resource set, each beam or spatial relation or an SRS resource group associated with an antenna panel includes 2 SRS resources that are configured with 1 port and 1 port, respectively. The 2 SRS resources are associated with the first case and the second case, respectively.

A sending manner of uplink transmission is determined according to reference signal information or a predetermined manner. The sending manner of the uplink transmission includes one of the following: a sending period of the uplink transmission belonging to the first case; or the sending period of the uplink transmission belonging to the second case.

The uplink transmission includes at least one: SRS transmission, PUSCH transmission, or PUCCH transmission. A relation among the PUSCH and the SRS and the cases is described below with the PUSCH transmission as an example.

In the case where the uplink transmission is the PUSCH transmission, the reference signal information is the SRI included in the DCI that schedules the PUSCH transmission.

For example, the base station schedules or triggers the UE to send the PUSCH transmission, an SRS resource indicator (SRI) is indicated. The SRI is an index of the SRS resource in the SRS resource set, where a function of the SRS resource set is the same as a transmission configuration parameter of the PUSCH. The PUSCH transmission is consistent with a case associated with the SRS resource indicated by the SRI, such as the first case or the second case.

In the case where the uplink transmission is the PUSCH transmission, the reference signal information is the SRS resource set or number of the SRS resource set included in the DCI that schedules the PUSCH transmission.

For example, the base station schedules or triggers the UE to send the PUSCH transmission, number of the SRS resource set and the SRI are indicated. The SRI is an index of the SRS resource in the SRS resource set, where a function of the SRS resource set being the same as a transmission configuration parameter of the PUSCH. The PUSCH transmission is consistent with the case associated with the SRS resource set, such as the first case or the second case.

Different SRS resources are associated with different cases, and an associated case is obtained through the SRI when the PUSCH is scheduled.

Different SRS resource sets are associated with different cases, and an associated case is obtained through number of the SRS resource set when the PUSCH is scheduled.

In the case where number of the case to which the transmission period belongs is determined according to the predetermined manner, the base station ensures that a case associated with scheduled PUSCH transmission is consistent with the case to which the transmission period belongs.

In the case where the case associated with the scheduled PUSCH transmission is inconsistent with the case to which the transmission period belongs, in the case where the PUSCH transmission associated with the second case is sent in the time period of the first case, the PUSCH transmission is sent using only one port.

In the case where the case associated with the scheduled PUSCH transmission is inconsistent with the case to which the transmission period belongs, in the case where the PUSCH transmission associated with the first case is sent in the time period of the second case, the PUSCH transmission is only sent by using one port corresponding to the first case among multiple ports in the second case.

In the case where number of the case to which the transmission period belongs is determined according to number of the case associated with the transmission, an interval between scheduling information of the transmission and the transmission is greater than a predetermined threshold. In this manner, it is ensured that there is enough time for the UE to switch between different cases.

For the PUSCH transmission, reference is made to the SRS that is consistent with the case associated with the PUSCH transmission. For example, for CC2, the case associated with the SRS resource corresponding to the SRI in the DCI including the scheduling information of the PUSCH transmission is the same as the case associated with the PUSCH transmission. The following two cases are included: in the case where the case associated with the PUSCH is determined according to a time domain parameter of the PUSCH transmission, that is, number of the case to which the transmission period belongs is determined according to the predetermined manner, then the case associated with the SRS resource corresponding to the SRI is consistent with the case associated with the PUSCH transmission; in the case where number of the case to which the transmission period belongs is determined according to number of the case associated with the transmission, the case associated with the PUSCH is also consistent with the case associated with the SRI.

In another embodiment, for the PUSCH transmission associated with the first case, reference may be made to the SRS associated with the second case. For example, the SRS resource associated with the second case is configured with 2 ports, and for the PUSCH transmission associated with the first case, reference is made to 1 port among the 2 ports.

A transmitted precoding matrix indicator (TPMI) is described below with reference to Table 1. In the case where the PUSCH transmission is associated with the first case, the PUSCH transmission is one-port transmission, and no indication of TPMI is required.

In the case where the PUSCH transmission is associated with the second case and the number of ports configured by the SRS resource associated with the SRI is 1, then the PUSCH transmission is one-port transmission, and no indication of TPMI is required.

In the case where the PUSCH transmission is associated with the second case and the number of ports configured by the SRS resource associated with the SRI being greater than or equal to 1, then the PUSCH transmission still requires the indication of TPMI. Assuming that the number of ports configured by the SRS resource associated with the SRI is 2, the TPMI is parsed by a precoding codebook with 2 ports.

In the case where the UE operates in the second case, the base station schedules the UE to send the PUSCH transmission, and a codeword of the TPMI is $$\frac{1}{\sqrt{2}}\begin{bmatrix}1\\0\end{bmatrix}.$$

In the case where an antenna corresponding to port 0 is a fixed antenna, the PUSCH transmission may be a transmission associated with the second case or a transmission associated with the first case. In the case where the antenna corresponding to port 0 is a flexible antenna, the PUSCH transmission is a transmission associated with the second case.

On a second carrier, the first case and the second case may be distinguished by the TPMI. The second case supports a precoding codebook with 2 ports, while the first case can only use part of codewords. For example, the transmission of the second case may use all codewords in the table below, while the transmission of the first case can only use one codeword $$\frac{1}{\sqrt{2}}\begin{bmatrix}1\\0\end{bmatrix}.$$

In the case where the UE operates in the second case, a first PUSCH transmission uses the TPMI with a codeword of $$\frac{1}{\sqrt{2}}\begin{bmatrix}1\\0\end{bmatrix}$$

and a second PUSCH transmission uses other codewords, a time interval between the first PUSCH transmission and the second PUSCH transmission needs to be greater than a predetermined time.

A switching time between transmission sent in the first case and transmission sent in the second case, that is, between an ending time of the transmission sent earlier and a starting time of the transmission sent later, is not less than a predetermined time interval or not less than a time interval determined according to a capability of the UE.

On the second carrier, SRI1 is used as a reference for PUSCH transmission 1 ending at an occasion t1, and SRI2 is used as a reference for PUSCH transmission 2 starting at an occasion t2, where the an occasion t1 is earlier than the occasion t2, SRI1 is associated with the first case, SRI2 is associated with the second case, and a difference between t1 and t2 s not less than a predetermined time interval or not less than the time interval determined according to the capability of the UE. On the second carrier, SRI2 is used as a reference for PUSCH transmission 3 ending at an occasion t3, and SRI1 is used as a reference for PUSCH transmission 4 starting at an occasion t4, where the an occasion t3 is earlier than the occasion t4, SRI1 is associated with the first case, SRI2 is associated with the second case, and a difference between t3 and t4 is not less than a predetermined time interval or not less than the time interval determined according to the capability of the UE. In the present application, the first case being corresponded to the first type, and the second case being corresponded to the second type.

| | Non-coh UE | Full coh UE |
|---|---|---|
| Mode 1 | Rank 1 | Rank 1 |
| | $\frac{1}{\sqrt{2}}\begin{bmatrix}1\\0\end{bmatrix}\frac{1}{\sqrt{2}}\begin{bmatrix}0\\1\end{bmatrix}\frac{1}{\sqrt{2}}\begin{bmatrix}1\\1\end{bmatrix}$ | $\frac{1}{\sqrt{2}}\begin{bmatrix}1\\0\end{bmatrix}\frac{1}{\sqrt{2}}\begin{bmatrix}0\\1\end{bmatrix}$ |
| | Rank 2 | |
| | | $\frac{1}{\sqrt{2}}\begin{bmatrix}1\\1\end{bmatrix}\frac{1}{\sqrt{2}}\begin{bmatrix}1\\-1\end{bmatrix}\frac{1}{\sqrt{2}}\begin{bmatrix}1\\j\end{bmatrix}\frac{1}{\sqrt{2}}\begin{bmatrix}1\\-j\end{bmatrix}$ |
| | $\frac{1}{\sqrt{2}}\begin{bmatrix}1&0\\0&1\end{bmatrix}$ | Rank 2 |
| | | $\frac{1}{\sqrt{2}}\begin{bmatrix}1&0\\0&1\end{bmatrix}\frac{1}{2}\begin{bmatrix}1&1\\1&-1\end{bmatrix}\frac{1}{2}\begin{bmatrix}1&1\\j&-j\end{bmatrix}$ |
| Mode 2 | Rank 1 | Rank 1 |
| | $\frac{1}{\sqrt{2}}\begin{bmatrix}1\\0\end{bmatrix}\frac{1}{\sqrt{2}}\begin{bmatrix}0\\1\end{bmatrix}$ | $\frac{1}{\sqrt{2}}\begin{bmatrix}1\\0\end{bmatrix}\frac{1}{\sqrt{2}}\begin{bmatrix}0\\1\end{bmatrix}$ |
| | Rank 2 | |
| | | $\frac{1}{\sqrt{2}}\begin{bmatrix}1\\1\end{bmatrix}\frac{1}{\sqrt{2}}\begin{bmatrix}1\\-1\end{bmatrix}\frac{1}{\sqrt{2}}\begin{bmatrix}1\\j\end{bmatrix}\frac{1}{\sqrt{2}}\begin{bmatrix}1\\-j\end{bmatrix}$ |
| | $\frac{1}{\sqrt{2}}\begin{bmatrix}1&0\\0&1\end{bmatrix}$ | Rank 2 |
| | | $\frac{1}{\sqrt{2}}\begin{bmatrix}1&0\\0&1\end{bmatrix}\frac{1}{2}\begin{bmatrix}1&1\\1&-1\end{bmatrix}\frac{1}{2}\begin{bmatrix}1&1\\j&-j\end{bmatrix}$ |

From the description of the preceding embodiments, it is to be understood by those skilled in the art that the method of the preceding embodiments may be implemented by means of software plus a general-purpose hardware platform, or, of course, may be implemented by hardware. Based on such understanding, the technical solution provided by the present application may be embodied in the form of a software product. The computer software product is stored in a storage medium (such as a read-only memory (ROM), a random-access memory (RAM), a magnetic disk or an optical disk) and several instructions are included for enabling a terminal device (which may be a mobile phone, a computer, a server or a network device) to perform the method described in embodiments of the present application.

Embodiment Five

This embodiment further provides a power control apparatus. The apparatus is used for implementing the embodiments and optional embodiments described above. What has been described being not repeated herein. As used below, the term "module" may be software, hardware or a combination of software and hardware capable of implementing predetermined functions. The apparatus in the embodiments described below may be implemented by software, but implementation by hardware or by a combination of software and hardware is also possible and conceived.

Figure 10:
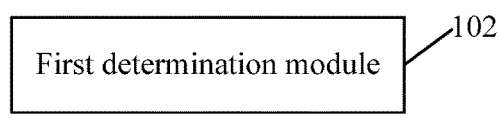
FIG. 10 is block diagram one of a power control apparatus according to an embodiment of the present disclosure.

FIG. 10 is block diagram one of a power control apparatus according to an embodiment of the present disclosure. The apparatus is applied to a first communication node side. As shown in FIG. 10, the apparatus includes a first determination module 102 configured to, in the case where a first condition is satisfied, determine a power control parameter of uplink transmission in a predetermined manner, or trigger that the first communication node determines the power control parameter of the uplink transmission autonomously.

Embodiment Six

Figure 11:
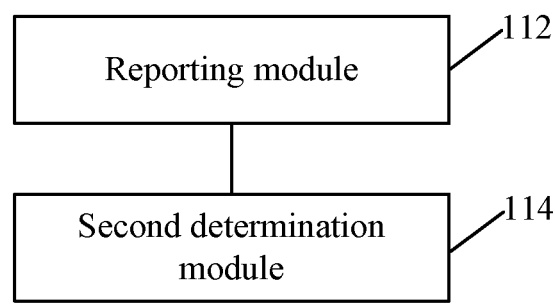
FIG. 11 is block diagram two of a power control apparatus according to an embodiment of the present disclosure.

FIG. 11 is block diagram two of a power control apparatus according to an embodiment of the present disclosure. The apparatus is applied to a first communication node side. As shown in FIG. 11, the apparatus includes a reporting module 112 configured to, in the case where a third condition is satisfied, report a measurement result to a second communication node; and a second determination module 114 coupled and connected to the reporting module 112 and configured to determine power of uplink transmission according to a power control parameter sent by the second communication node.

Optionally, in this embodiment, the third condition includes at least one of the following: a difference between an optimal PL-RS and a PL of the PL-RS being used being greater than a preset threshold value; or a time interval between a current report and a previous report exceeds a preset time period.

Optionally, in this embodiment, the measurement result includes at least one of the following: 1) a difference between an optimal RS for measuring the PL and a PL being used in the RS for measuring the PL; 2) an indication in which the difference between the optimal RS for measuring the PL and the PL being used in the RS for measuring the PL exceeds a threshold; 3) a state indication in which the difference between the optimal RS for measuring the PL and the PL being used in the RS for measuring the PL exceeds the threshold; or 4) an optimal RS recommended by the first communication node for measuring the PL.

Optionally, the manner in which the first communication node reports the measurement result includes at least one of the following: through an MAC CE of a PHR; through an MAC CE of an independent PL or PL-RS; or through a CSI report.

Embodiment Seven

Figure 12:
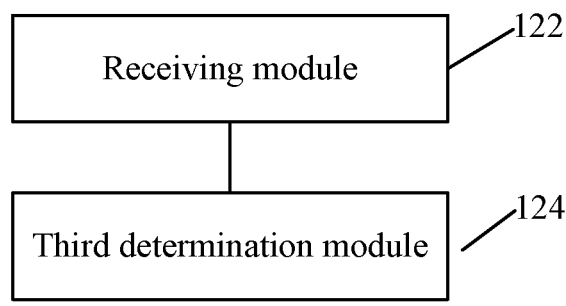
FIG. 12 is block diagram three of a power control apparatus according to an embodiment of the present disclosure.

FIG. 12 is block diagram three of a power control apparatus according to an embodiment of the present disclosure. The apparatus is applied to a first communication node side. As shown in FIG. 12, the apparatus includes a receiving module 122 configured to receive a power control parameter sent by a second communication node; and a third determination module 124 configured to determine power of uplink transmission according to the power control parameter. Where an effective time of the power control parameter is determined according to at least one of the following: in the case where PL-RS included in power control parameter information belongs to an RS set for measuring a PL of the first communication node, the power control parameter being effective after correctly received; and in the case where the PL-RS included in the power control parameter information not belonging to the RS set for measuring the PL of the first communication node, the power control parameter being effective after correctly received for a first time.

Optionally, in this embodiment, the receiving module 102 receives the power control parameter in the following manner: the second communication node carries the power control parameter through RRC signaling, or the second communication node carries the power control parameter through an MAC CE.

Optionally, the first time is determined according to at least one of the following manners: after the PL-RS indicated by the power control parameter information is sent at least once; a predefined duration; or a duration determined according to a capability of the UE.

Power control parameter information received or effective before a second time when the uplink transmission starts is used for determining a transmit power of the uplink transmission.

Optionally, the second time is determined by a sending or receiving time of the DCI that schedules or activates the uplink transmission, or the second time is determined by the capability of the UE. Optionally, determining the second time by the sending or receiving time of the DCI that schedules or activates the uplink transmission includes that the second time includes a duration from the sending or receiving time of the DCI that schedules or activates the uplink transmission to a starting time of the uplink transmission.

Embodiment Eight

An embodiment of the present disclosure provides a sending apparatus for uplink transmission. The apparatus is applied to a first communication node side. The apparatus includes a fourth determination module configured to determine a sending type of uplink transmission according to reference signal information or a predetermined manner.

The sending type of the uplink transmission includes a first type and a second type; and a time interval between the uplink transmission of the first type and the uplink transmission of the second type is greater than or equal to a first time offset.

It is to be noted that the various modules described above may be implemented by software or hardware. An implementation by hardware may, but may not necessarily, be performed in the following manners: the various modules described above are located in the same processor, or the various modules described above are located in their respective processors in any combination form.

Embodiment Nine

An embodiment of the present application further provides a storage medium. The storage medium stores a computer program which is configured to, when executed, perform the steps in any one of the preceding method embodiments.

Optionally, in this embodiment, the preceding storage medium may be configured to store a computer program for performing the following.
In S1, in the case where a first condition is satisfied, a first communication node determines a power control parameter of uplink transmission in a predetermined manner, or the first communication node determines the power control parameter of the uplink transmission autonomously.

Optionally, in this embodiment, the preceding storage medium may be configured to store a computer program for performing the following.
In S3, in the case where a third condition is satisfied, a first communication node reports a measurement result to a second communication node.
In S2, the first communication node determines power of uplink transmission according to a power control parameter sent by the second communication node.

Optionally, in this embodiment, the preceding storage medium may be configured to store a computer program for performing the following.
In S1, a first communication node receives a power control parameter sent by a second communication node.
In S2, the first communication node determines power of uplink transmission according to the power control parameter. Where an effective time of the power control parameter is determined according to at least one of the following: in the case where PL-RS included in power control parameter information belongs to an RS set for measuring a PL of the first communication node, the power control parameter being effective after correctly received; and in the case where the PL-RS included in the power control parameter information not belonging to the RS set for measuring the PL of the first communication node, the power control parameter being effective after correctly received for a first time.

Optionally, in this embodiment, the preceding storage medium may be configured to store a computer program for performing the following.
In S1, a sending type of uplink transmission is determined according to reference signal information or a predetermined manner.
The sending type of the uplink transmission includes a first type and a second type; and a time interval between the uplink transmission of the first type and the uplink transmission of the second type is greater than or equal to a first time offset.

Optionally, in this embodiment, the storage medium may include, but is not limited to, a USB disk, an ROM, an RAM, a mobile hard disk, a magnetic disk, an optical disk or another medium capable of storing computer programs.

An electronic apparatus is further provided in an embodiment of the present application and includes a memory and a processor. The memory stores a computer program, and the processor is configured to execute the computer program to perform the steps in any one of the preceding method embodiments.

Optionally, the electronic apparatus may further include a transmission device and an input/output device. Both the transmission device and the input/output device are connected to the processor. Optionally, in the embodiment, the processor may be configured to perform the following through a computer program.

In S1, in the case where a first condition is satisfied, a first communication node determines a power control parameter of uplink transmission in a predetermined manner, or the first communication node determines the power control parameter of the uplink transmission autonomously.

Optionally, in the embodiment, the processor may be configured to perform the following through a computer program.

In S3, in the case where a third condition is satisfied, a first communication node reports a measurement result to a second communication node.

In S2, the first communication node determines power of uplink transmission according to a power control parameter sent by the second communication node.

Optionally, in the embodiment, the processor may be configured to perform the following through a computer program.

In S1, a first communication node receives a power control parameter sent by a second communication node.

In S2, the first communication node determines power of uplink transmission according to the power control parameter; where an effective time of the power control parameter is determined according to at least one of the following: in the case where PL-RS included in power control parameter information belongs to an RS set for measuring a PL of the first communication node, the power control parameter being effective after correctly received; and in the case where the PL-RS included in the power control parameter information not belonging to the RS set for measuring the PL of the first communication node, the power control parameter being effective after correctly received for a first time.

Optionally, in the embodiment, the processor may be configured to perform the following through a computer program.

In S1, a sending type of uplink transmission is determined according to reference signal information or a predetermined manner.

The sending type of the uplink transmission includes a first type and a second type; and a time interval between the uplink transmission of the first type and the uplink transmission of the second type is greater than or equal to a first time offset.

Optionally, for specific examples in this embodiment, reference may be made to the examples described in the embodiments and optional embodiments described above. Details are not repeated here.

Apparently, it should be understood by those skilled in the art that each of the preceding modules or steps of the present disclosure may be implemented by a general-purpose computing apparatus, the modules or steps may be concentrated on a single computing apparatus or distributed on a network composed of multiple computing apparatuses, and optionally, the modules or steps may be implemented by program codes executable by the computing apparatus, so that the modules or steps may be stored in a storage apparatus and executed by the computing apparatus. In some circumstances, the illustrated or described steps may be executed in sequences different from those described herein, or the modules or steps may be made into various integrated circuit modules separately, or multiple modules or steps therein may be made into a single integrated circuit module for implementation. In this manner, the present application is not limited to any particular combination of hardware and software.

What is claimed is:

1. A power control method, comprising:
    receiving, by a first communication node, a power control parameter sent by a second communication node; and
    determining, by the first communication node, power of uplink transmission according to the power control parameter and an effective time of the power control parameter;
    wherein the effective time is determined according to:
    a sending occasion of hybrid automatic repeat-request acknowledgement (HARQ-ACK) signaling associated with a physical downlink shared channel (PDSCH) carrying the power control parameter; and
    delaying a first time.

2. The method of claim 1, wherein
    in a case where a path loss measurement reference signal comprised in the power control parameter does not belong to a reference signal (RS) set for measuring a path loss (PL) of the first communication node, the effective time is determined according to
    the sending occasion of HARQ-ACK signaling associated with the PDSCH carrying the power control parameter and delaying the first time.

3. The method of claim 1, wherein the power of uplink transmission is determined further according to a path loss mode, wherein the path loss mode comprises a high layer filtering path loss mode or a physical layer filtering path loss mode;
    wherein the path loss mode is determined according to at least one of the following: a physical layer filtering path loss capability of the first communication node; or the path loss mode configured or indicated by the second communication node.

4. The method of claim 1, wherein the power of uplink transmission is determined further according to a path loss mode, and in a case where the path loss mode of the first communication node is a physical layer filtering path loss mode, the effective time is determined according to:
    an occasion when the power control parameter is received, and delaying the first time; or
    the sending occasion of HARQ-ACK signaling associated with the PDSCH carrying the power control parameter, and delaying the first time.

5. The method of claim 1, wherein the first time is determined according to at least one of:
    a path loss measurement parameter indicated by power control parameter information received at least once;
    a predetermined duration;
    a duration configured by the second communication node; or
    a duration determined according to a capability of the first communication node.

6. The method of claim 1, wherein the power control parameter is carried through a medium access control (MAC) control element (CE) from the second communication node.

7. An electronic apparatus, comprising a memory and a processor, wherein the memory stores computer programs, and the processor being configured to execute the computer programs to perform a power control method, wherein the method comprises:

receiving, by a first communication node, a power control parameter sent by a second communication node; and determining, by the first communication node, power of uplink transmission according to the power control parameter and an effective time of the power control parameter;

wherein the effective time is determined according to:

a sending occasion of hybrid automatic repeat-request acknowledgement (HARQ-ACK) signaling associated with a physical downlink shared channel (PDSCH) carrying the power control parameter; and delaying a first time.

8. The electronic apparatus of claim 7, wherein the power control parameter is carried through a medium access control (MAC) control element (CE) from the second communication node.

9. The electronic apparatus of claim 7, wherein in a case where a path loss measurement reference signal comprised in the power control parameter does not belong to a reference signal (RS) set for measuring a path loss (PL) of the first communication node, the effective time is determined according to the sending occasion of HARQ-ACK signaling associated with the PDSCH carrying the power control parameter and delaying the first time.

10. The electronic apparatus of claim 7, wherein the power of uplink transmission is determined further according to a path loss mode, wherein the path loss mode comprises a high layer filtering path loss mode or a physical layer filtering path loss mode;

wherein the path loss mode is determined according to at least one of the following: a physical layer filtering path loss capability of the first communication node; or the path loss mode configured or indicated by the second communication node.

11. The electronic apparatus of claim 10, wherein in a case where the path loss mode of the first communication node is the physical layer filtering path loss mode, the effective time is determined according to:

an occasion when the power control parameter is received, and delaying the first time; or the sending occasion of HARQ-ACK signaling associated with the PDSCH carrying the power control parameter, and delaying the first time.

12. The electronic apparatus of claim 7, wherein the first time is determined according to at least one of:

a path loss measurement parameter indicated by power control parameter information received at least once;

a predetermined duration;

a duration configured by the second communication node; or a duration determined according to a capability of the first communication node.

13. A non-transitory computer-readable storage medium storing a computer program, wherein when executed, the computer program being configured to perform a power control method, wherein the method comprises:

receiving, by a first communication node, a power control parameter sent by a second communication node; and determining, by the first communication node, power of uplink transmission according to the power control parameter and an effective time of the power control parameter;

wherein the effective time is determined according to:

a sending occasion of hybrid automatic repeat-request acknowledgement (HARQ-ACK) signaling associated with a physical downlink shared channel (PDSCH) carrying the power control parameter; and delaying a first time.

* * * * *